US012618539B2

(12) United States Patent
Kim et al.

(10) Patent No.: US 12,618,539 B2
(45) Date of Patent: May 5, 2026

(54) LIGHTING DEVICE FOR VEHICLE

(71) Applicant: HYUNDAI MOBIS CO., LTD., Seoul (KR)

(72) Inventors: Min Ji Kim, Yongin-si (KR); Do Hyung Kim, Yongin-si (KR); Phil Su Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/904,692

(22) Filed: Oct. 2, 2024

(65) Prior Publication Data

US 2026/0036276 A1 Feb. 5, 2026

(30) Foreign Application Priority Data

Aug. 5, 2024 (KR) ........................ 10-2024-0104147

(51) Int. Cl.
*F21S 41/43* (2018.01)
*F21S 41/143* (2018.01)
*F21S 41/20* (2018.01)

(52) U.S. Cl.
CPC ............. *F21S 41/43* (2018.01); *F21S 41/143* (2018.01); *F21S 41/285* (2018.01)

(58) Field of Classification Search
CPC ........ F21S 41/43; F21S 41/143; F21S 41/285; F21S 43/20
See application file for complete search history.

(56) References Cited

U.S. PATENT DOCUMENTS

| | | | | |
|---|---|---|---|---|
| 11,180,075 B1 * | 11/2021 | Lee | B60Q 1/2661 |
| 11,667,235 B1 * | 6/2023 | Hwang | B60Q 1/28 362/92 |
| 11,754,252 B2 * | 9/2023 | Lee | F21S 43/255 362/516 |
| 12,196,384 B2 * | 1/2025 | Rother | B60R 19/52 |
| 2021/0095830 A1 | 4/2021 | Hansen | |
| 2025/0075873 A1 * | 3/2025 | Park | F21S 43/28131 |

FOREIGN PATENT DOCUMENTS

| | | | |
|---|---|---|---|
| DE | 102016217949 | A1 | 3/2018 |
| DE | 102020129958 | A1 | 7/2021 |
| DE | 102020133087 | A1 | 4/2022 |
| DE | 102021133402 | A1 | 6/2023 |
| DE | 102023112835 | A1 | 7/2024 |
| KR | 20200036842 | A | 4/2020 |
| KR | 10-2023-0077201 | A | 6/2023 |
| WO | 2023/160028 | A1 | 8/2023 |

OTHER PUBLICATIONS

Extended European Search Report issued on Mar. 10, 2025 in the corresponding European Patent Application No. 24210447.9.

* cited by examiner

*Primary Examiner* — Matthew J. Peerce
(74) *Attorney, Agent, or Firm* — NovoTechIP International PLLC

(57) ABSTRACT

Provided is a lighting device for a vehicle including a light source configured to emit light, a shield layer configured to be positioned in front of the light source, and have a shield portion that shields light emitted from the light source and a first pattern portion through which the light emitted from the light source is transmitted, and a pattern layer configured to be positioned in front of the shield layer, include a light-transmissive material, and have a second pattern portion.

15 Claims, 8 Drawing Sheets

LIGHTING DEVICE FOR VEHICLE

CROSS-REFERENCE TO RELATED APPLICATIONS

This application claims priority from and the benefit under 35 USC § 119 of Korean Patent Application No. 10-2024-0104147, filed on Aug. 5, 2024, 2024, in the Korean Intellectual Property Office, the entire disclosure of which is incorporated by reference for all purposes.

TECHNICAL FIELD

Exemplary embodiments of the present disclosure relate to a lighting device for a vehicle, and more particularly, to a lighting device for a vehicle capable of implementing grille lighting.

BACKGROUND

In recent years, vehicle manufacturers have been attempting to fill the reduced visual density of front surfaces of electric vehicles by creating differentiated lighting images, making an effort to add new value through unexpected effects in the space where the grille of electric vehicles has disappeared, and investing heavily in 3D stereoscopic grille lighting for eye-catching visual effects.

Conventionally, there have been limitations in grille lighting content and technological implementation solutions that effectively express brand identity. As the lighting area expands to include the grille, various issues have arisen, including increased development and production costs, as well as weight gain due to the use of multiple lighting devices. Therefore, these limitations and issues require improvement.

The related art of the present disclosure is disclosed in Korean Patent Application Publication No. 10-2023-0077201 (published on Jun. 1, 2023 and entitled "The lighting grill for the electric vehicle").

SUMMARY

Various embodiments of the present disclosure are directed to a lighting device for a vehicle capable of providing a three-dimensional image to drivers, surrounding vehicles, and pedestrians by implementing grille lighting.

A lighting device for a vehicle according to an aspect of the present disclosure includes: a light source configured to emit light; a shield layer configured to be positioned in front of the light source, and have a shield portion that shields light emitted from the light source and a first pattern portion through which the light emitted from the light source is transmitted; and a pattern layer configured to be positioned in front of the shield layer, include a light-transmissive material, and have a second pattern portion.

The lighting device for a vehicle according to an aspect of the present disclosure may further include a color layer configured to be positioned between the shield layer and the pattern layer and include a light-transmissive material.

The color layer may include a film having the same color as a vehicle body.

The color layer may include a film coated with paint having the same color as the vehicle body.

The lighting device for a vehicle according to an aspect of the present disclosure may further include a cover configured to be positioned in front of the pattern layer to cover the pattern layer and made of a transparent material.

The second pattern portion may include a three-dimensional pattern externally visible from the outside.

The first pattern portion may be positioned to overlap with the second pattern portion.

The lighting device for a vehicle according to an aspect of the present disclosure may further include a housing configured to house the light source, the shield layer, and the pattern layer therein and be mounted on a grille provided on a front surface portion of the vehicle body.

A lighting device for a vehicle according to another aspect of the present disclosure may include: a light source configured to emit light; a shield layer configured to be positioned in front of the light source, and have a shield portion that shields light emitted from the light source and a first pattern portion through which the light emitted from the light source is transmitted; a pattern layer configured to be positioned in front of the shield layer, include a light-transmissive material, and have a second pattern portion; and a cover configured to be positioned between the shield layer and the pattern layer to cover the shield layer and made of a transparent material.

The lighting device for a vehicle according to another aspect of the present disclosure may further include a color layer configured to be positioned between the cover and the pattern layer and include a light-transmissive material.

The color layer may include a film having the same color as a vehicle body.

The color layer may include a film coated with paint having the same color as the vehicle body.

The second pattern portion may include a three-dimensional pattern externally visible from the outside.

The first pattern portion may be positioned to overlap with the second pattern portion.

The pattern layer may have a polyurethane coating on a front surface of the pattern layer.

The lighting device for a vehicle according to another aspect of the present disclosure may further include a housing configured to house the light source, the shield layer, the pattern layer, and the cover therein and be mounted on a bumper of the vehicle body.

The lighting device for a vehicle according to another aspect of the present disclosure may further include a housing configured to house the light source, the shield layer, the pattern layer, and the cover therein and be mounted on a grille provided on a front surface portion of the vehicle body.

The lighting device for a vehicle may express a three-dimensional optical illusion pattern on a vehicle skin by utilizing a pattern layer having a three-dimensional pattern, through which a three-dimensional image is created.

The lighting device for a vehicle may have a distinct competitive advantage by providing images both when turned on and when turned off.

With the lighting device for a vehicle, lighting effect that is hidden due to the shield layer when turned off becomes visible when turned on, allowing different grille images to be created in both daytime and nighttime conditions.

BRIEF DESCRIPTION OF THE DRAWINGS

IG. 1 is a front view of a lighting device for a vehicle according to one or more embodiments of the present disclosure, viewed from the front of a vehicle body.

FIG. 11 is a front view of a lighting device for a vehicle according to one or more embodiments of the present disclosure, viewed from the front of a vehicle body in a state in which a light source is turned on.

DETAILED DESCRIPTION

Figure 1:
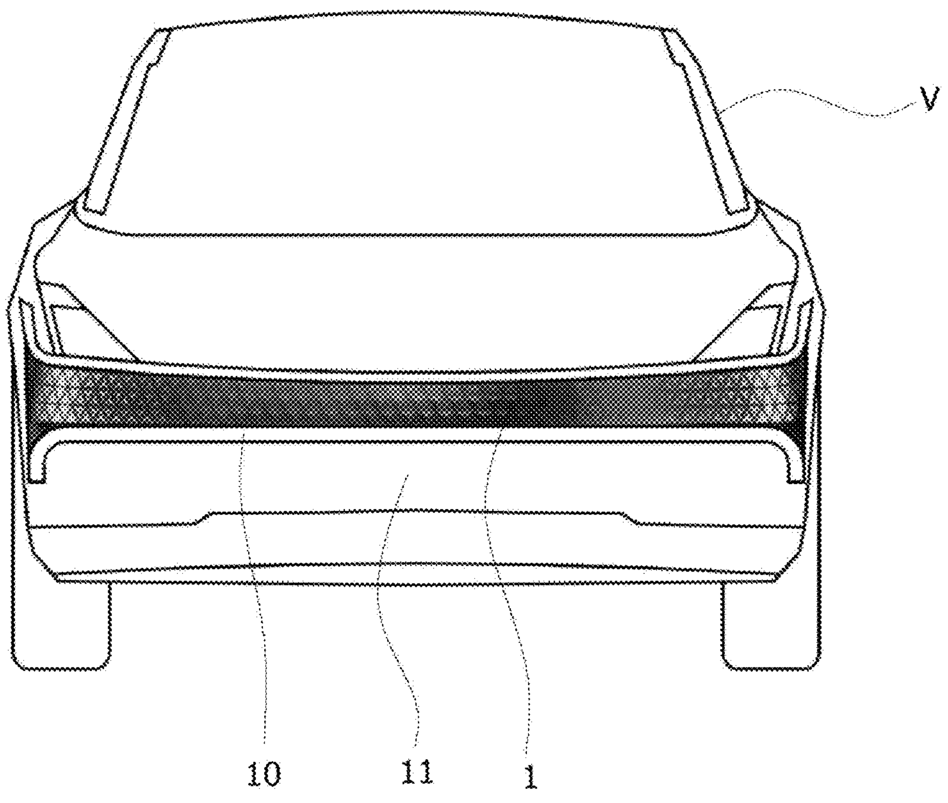

Embodiments of a lighting device for a vehicle according to the present disclosure will be described hereinafter with reference to the accompanying drawings. In this process, the thickness of lines and the size of elements illustrated in the drawing may be exaggerated for clarity and convenience of description. In addition, the terms used below are defined in consideration of the functions thereof in the present disclosure and may vary depending on the intention of a user or an operator or common practice. Therefore, these terms should be contextually defined in light of the present specification.

Furthermore, in this specification, when a part is described as being “connected (or linked)” to another part, this includes not only a case where it is “directly connected (or linked),” but also a case where it is “indirectly connected (or linked)” to another part with an intermediate member in between. When a part is referred to as “comprising (or having)” a certain element, it means that, unless specifically stated otherwise, it does not exclude other elements but may further “comprise (or have)” other elements.

Throughout this specification, the same reference numerals may refer to the same elements. Although the same or similar reference numerals may not be mentioned or described in a specific drawing, those reference numerals may be described based on other drawings. Even if there are parts in a specific drawing where reference numerals are not indicated, those parts may be described based on other drawings. Furthermore, the number, shape, size, and relative differences in size of the detailed elements included in the drawings of the present disclosure are set for ease of understanding and are not intended to limit embodiments, which may be implemented in various forms.

Figure 2:
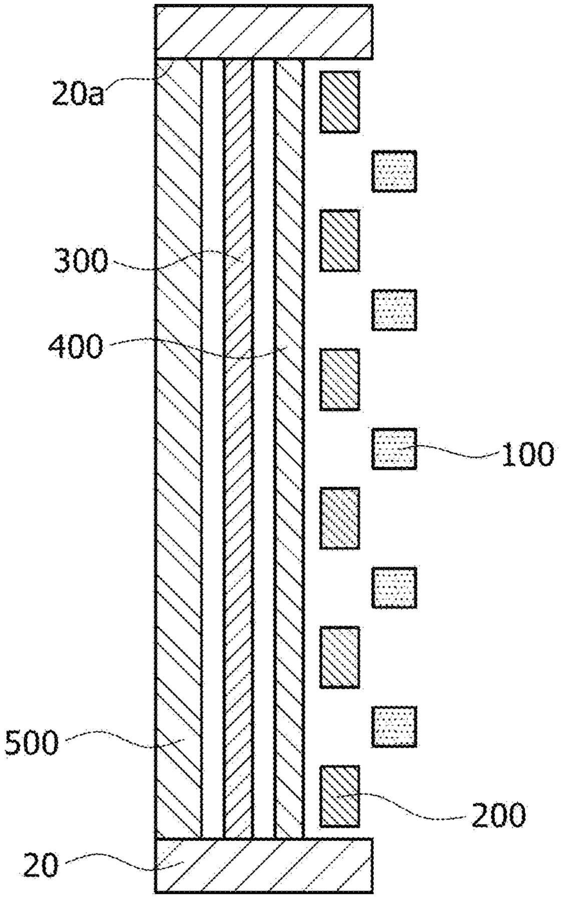
FIG. 2 is a cross-sectional view schematically showing a lighting device for a vehicle according to an embodiment of the present disclosure.
Figure 3:
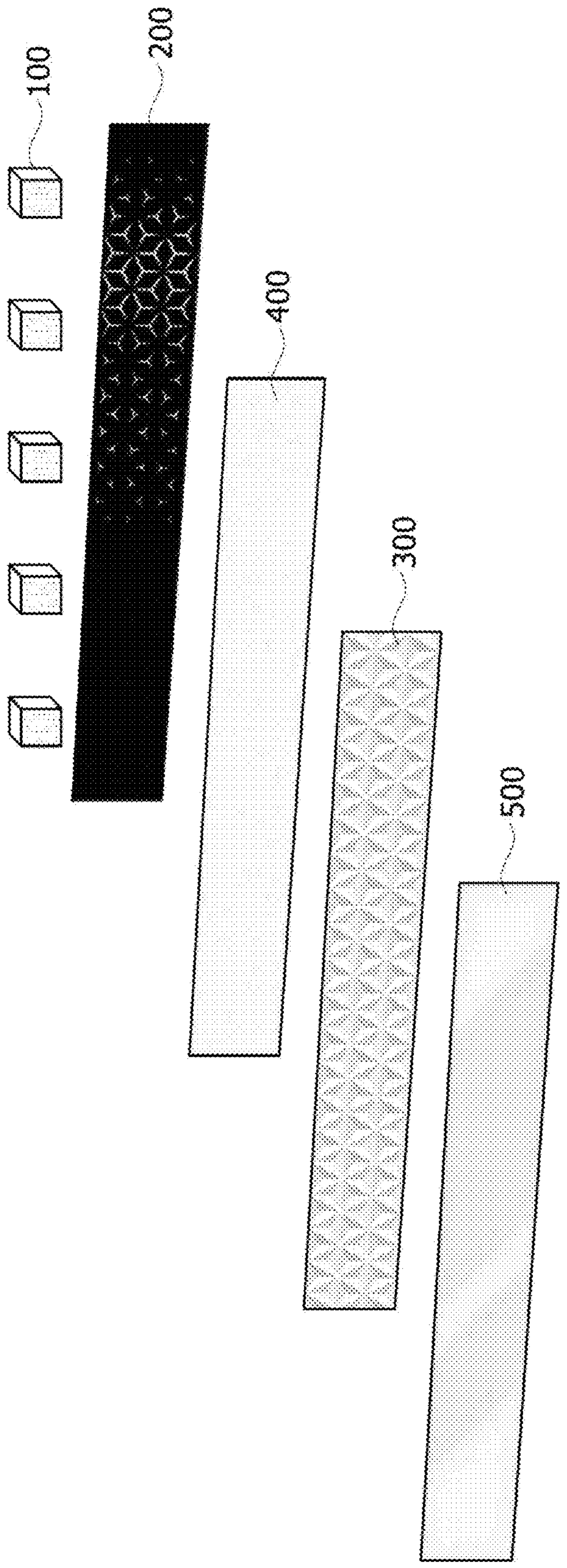
FIG. 3 is an exploded perspective view schematically showing a lighting device for a vehicle according to an embodiment of the present disclosure.
Figure 4:
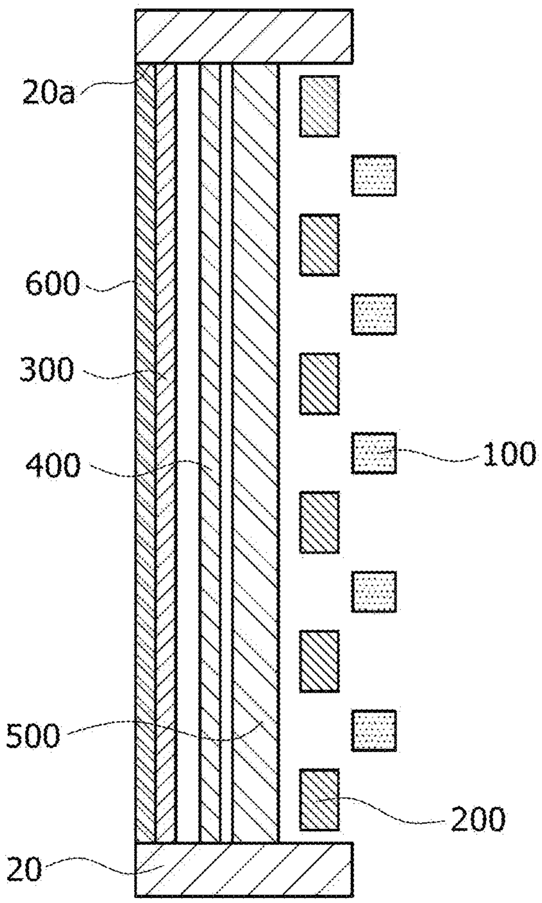
FIG. 4 is a cross-sectional view schematically showing a lighting device for a vehicle according to another embodiment of the present disclosure.
Figure 5:
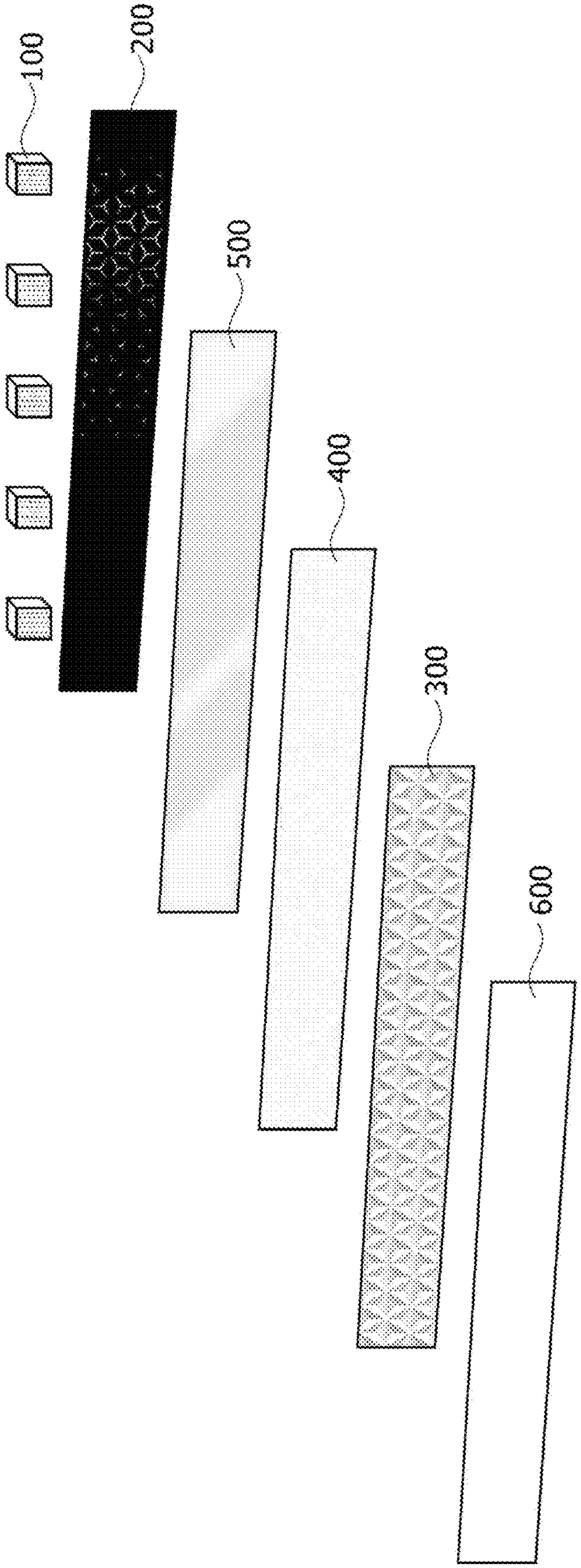
FIG. 5 is an exploded perspective view schematically showing a lighting device for a vehicle according to another embodiment of the present disclosure.
Figure 6:
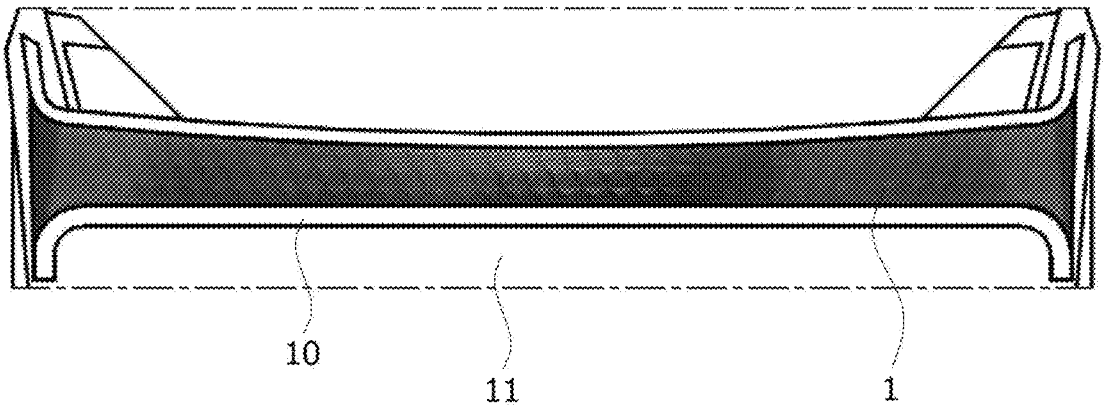
FIG. 6 is an illustrative view schematically showing a state in which a light source is turned off in a lighting device for a vehicle according to one or more embodiments of the present disclosure.
Figure 7:
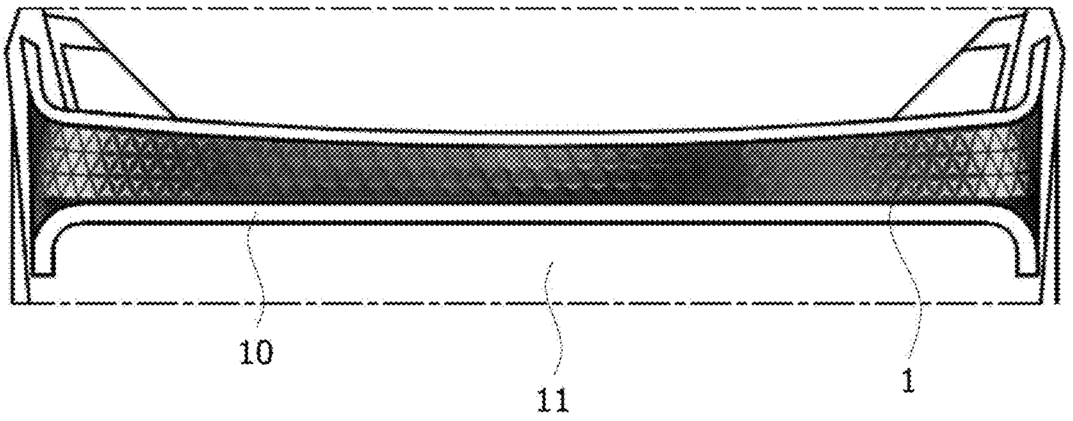
FIG. 7 is an illustrative view schematically showing a state in which a light source is turned on in a lighting device for a vehicle according to one or more embodiments of the present disclosure.
Figure 8:
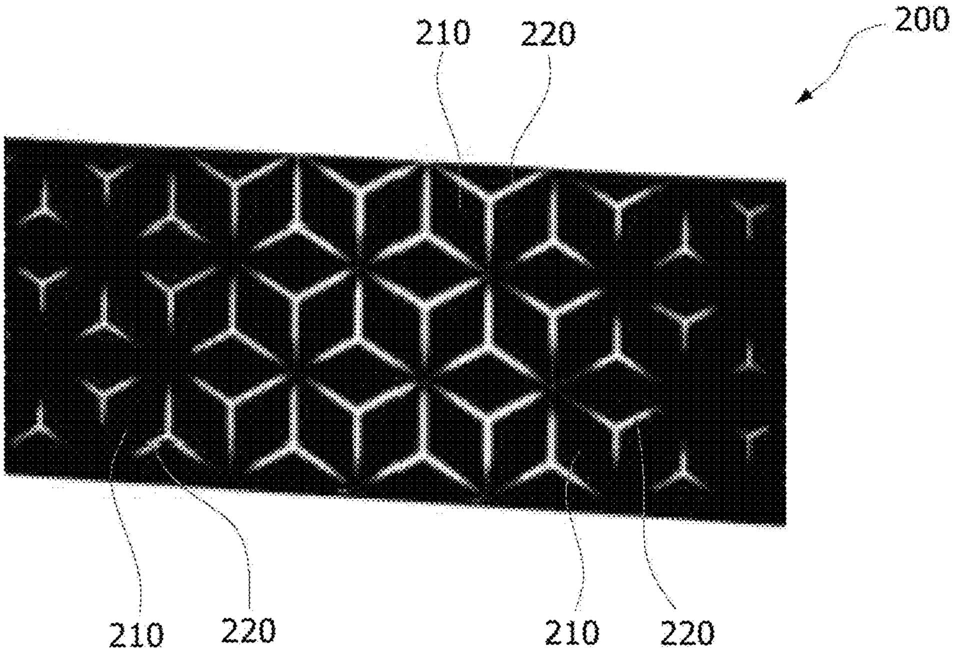
FIG. 8 is an enlarged view of a shield layer in a lighting device for a vehicle according to one or more embodiments of the present disclosure.
Figure 9:
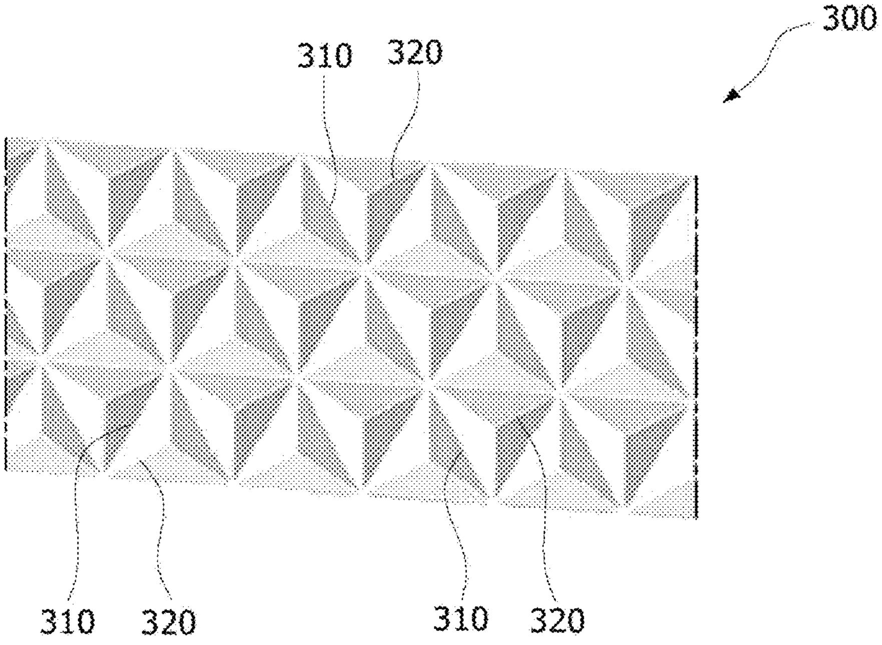
FIG. 9 is an enlarged view of a pattern layer in a lighting device for a vehicle according to one or more embodiments of the present disclosure.
Figure 10:
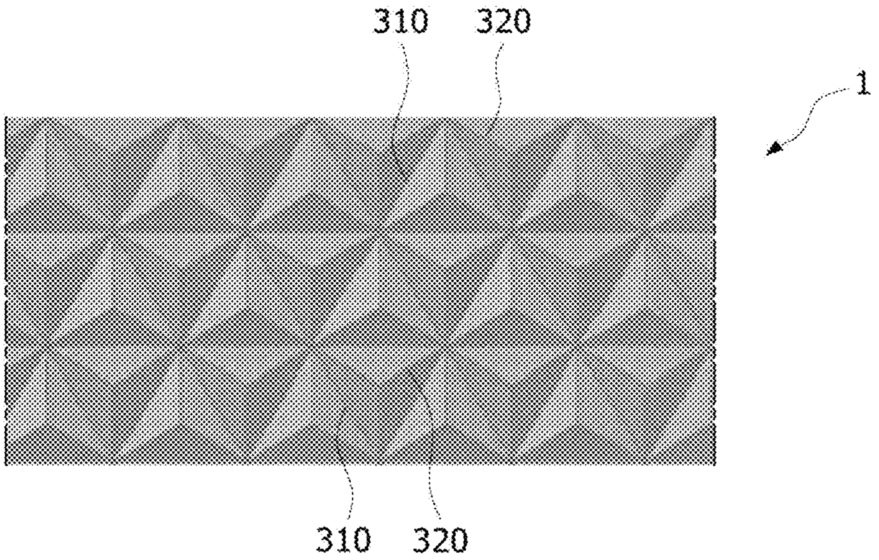
FIG. 10 is a front view of a lighting device for a vehicle according to one or more embodiments of the present disclosure, viewed from the front of a vehicle body in a state in which a light source is turned off.
Figure 11:
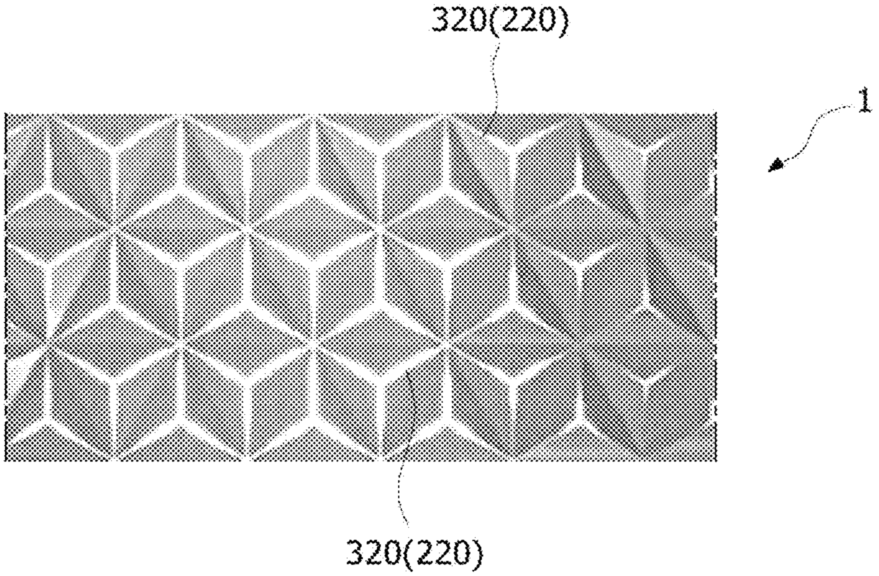

FIG. 1 is a front view of a lighting device for a vehicle according to one or more embodiments of the present disclosure, viewed from the front of a vehicle body. FIG. 2 is a cross-sectional view schematically showing a lighting device for a vehicle according to an embodiment of the present disclosure. FIG. 3 is an exploded perspective view schematically showing a lighting device for a vehicle according to an embodiment of the present disclosure. FIG. 4 is a cross-sectional view schematically showing a lighting device for a vehicle according to another embodiment of the present disclosure. FIG. 5 is an exploded perspective view schematically showing a lighting device for a vehicle according to another embodiment of the present disclosure. FIG. 6 is an illustrative view schematically showing a state in which a light source is turned off in a lighting device for a vehicle according to one or more embodiments of the present disclosure. FIG. 7 is an illustrative view schematically showing a state in which a light source is turned on in a lighting device for a vehicle according to one or more embodiments of the present disclosure. FIG. 8 is an enlarged view of a shield layer in a lighting device for a vehicle according to one or more embodiments of the present disclosure. FIG. 9 is an enlarged view of a pattern layer in a lighting device for a vehicle according to one or more embodiments of the present disclosure. FIG. 10 is a front view of a lighting device for a vehicle according to one or more embodiments of the present disclosure, viewed from the front of a vehicle body in a state in which a light source is turned off. FIG. 11 is a front view of a lighting device for a vehicle according to one or more embodiments of the present disclosure, viewed from the front of a vehicle body in a state in which a light source is turned on.

Referring to FIGS. 1 to 3 and FIGS. 6 to 11, a lighting device for a vehicle 1 according to an embodiment of the present disclosure includes a light source 100, a shield layer 200, and a pattern layer 300.

The lighting device for a vehicle 1 according to an embodiment of the present disclosure may further include a housing 20. The housing 20 may house the light source 100, the shield layer 200, and the pattern layer 300 therein.

The housing 20 may be mounted on a vehicle body V. The housing 20 may be mounted on a grille 10 provided on a front surface portion of the vehicle body V. The grille 10 may refer to a part of the front surface portion of the vehicle body V on which a radiator grille is mounted or which is alternatively occupied by the radiator grille. The housing 20 may be mounted on an interior door trim and cockpit in addition to the grille 10 to implement door trim lighting and cockpit lighting.

The housing 20 may be formed in a box shape, with an open front surface facing the front of the vehicle body V. Reference numeral **20*a* is an opening of the housing 20**.

The light source 100 may be installed inside the housing 20. The light source 100 may emit light toward the front of the shield layer 200.

The light from the light source 100 passes through a cover 500 and is emitted outward, making the light externally visible from outside of the lighting device for a vehicle 1. A plurality of light sources 100 may be provided and spaced apart along the longitudinal direction of the grille 10, which is the width direction of the vehicle body V. The light source 100 may include a light emitting diode (LED).

The shield layer 200 may be positioned in front of the light source 100 and partially shield light emitted from the light source 100. The shield layer 200 may be black to increase light shielding efficiency and take the form of a film.

The shield layer 200 may have a shield portion 210 and a first pattern portion 220. The shield portion 210 shields the light emitted from the light source 100, and the first pattern portion 220 allows the light emitted from the light source 100 to be transmitted.

Since the light emitted from the light source 100 is shielded in an area of the shield portion 210 and transmitted forward only through an area of the first pattern portion 220, a lighting pattern may be generated through the shape of the first pattern portion 220. In FIG. 8, a black portion represents the area of the shield portion 210, and a white portion represents the area of the first pattern portion 220. Since light is transmitted toward the front of the shield layer 200 only through the first pattern portion 220, various grille lighting effects may be created by changing the design of the first pattern portion 220.

The pattern layer 300 may be positioned in front of the shield layer 200 and include a light-transmissive material through which light is transmitted. The pattern layer 300 may have second pattern portions 310 and 320.

The second pattern portions 310 and 320 may include a three-dimensional pattern through which a three-dimensional image is created. The second pattern portions 310 and 320 may include a single or double three-dimensional pattern.

A three-dimensional optical illusion pattern may be expressed on a vehicle skin by the second pattern portions 310 and 320, through which a three-dimensional image is created when the light source 100 is turned on. Since the pattern layer 300 creates an optical illusion without a separate structure, various pattern designs may be incorporated into grille lighting.

The second pattern portions 310 and 320 may be externally visible from outside of the lighting device for a vehicle 1. The three-dimensional image of the second pattern portions 310 and 320 may be externally visible from the outside in both daytime and nighttime conditions.

The pattern layer 300 may take the form of a film, thereby achieving various patterns that are difficult to express with injection-molded parts. The pattern layer 300 may be an optical pattern film. The pattern layer 300 may be made of ultraviolet (UV) resin.

The pattern layer 300 may be made of a transparent or nearly transparent material. Since the pattern layer 300 is made of a transparent or nearly transparent material, when a color layer 400 is positioned between the pattern layer 300 and the shield layer 200, the lighting device for a vehicle 1 may be seen externally in the color of the color layer 400 from the outside.

The pattern layer 300 may be attached to the cover 500 through an autoclave process.

The lighting device for a vehicle 1 according to an embodiment of the present disclosure may further include the color layer 400.

The color layer 400 may be positioned between the shield layer 200 and the pattern layer 300. Since the color layer 400 includes a light-transmissive material, light from the light source 100 passes through the shield layer 200 and is emitted forward through the color layer 400.

The color layer 400 may include a film having the same color as the vehicle body. Alternatively, the color layer 400 may include a film coated with paint having the same color as the vehicle body.

Since the color layer 400 has the same color as the vehicle body V, the lighting device for a vehicle 1 may create a continuous image without a sense of disconnection from the vehicle body V.

The lighting device for a vehicle 1 according to an embodiment of the present disclosure may further include the cover 500.

The cover 500 is positioned in front of a pattern layer 300 and covers the pattern layer 300. The cover 500 may be made of plastic such as transparent polycarbonate and include a light-transmissive material.

The cover 500 may close an opening 20*a* of the housing 20 to prevent foreign substances from entering the interior of the housing 20. The cover 500 may be formed in the shape of a planar or curved surface to conform to the shape of the opening 20*a* of the housing 20. The cover 500 may take the form of a plate or panel.

Referring to FIGS. 8 to 11, the first pattern portion 220 may be positioned to overlap with part or all of the second pattern portions 310 and 320.

For example, among the second pattern portions 310 and 320, the second pattern portion 310 may overlap with the shield portion 210 but not with the first pattern portion 220. Therefore, even if light is emitted from the light source 100, the second pattern portion 310 does not allow light to be transmitted (see FIG. 10).

Among the second pattern portions 310 and 320, the second pattern portion 320 may overlap with the first pattern portion 220. Therefore, when light is emitted from the light source 100, the second pattern portion 320 may allow light to be transmitted (see FIG. 11).

The light from the light source 100 is emitted forward only through the first pattern portion 220 of the shield layer 200. Therefore, by varying the areas where the first pattern portion 220 and the second pattern portions 310 and 320 overlap, various graphic images may be created when the light source is turned on in the nighttime.

The first pattern portion 220 of the shield layer 200 and the second pattern portion 320 of the pattern layer 300 may be manufactured such that their patterns align with or overlap each other using alignment marks in the printing process.

The operation of the lighting device for a vehicle 1 according to an embodiment of the present disclosure having the configuration described above will be described as follows.

Referring to FIGS. 6 and 10, when the light source 100 is not turned on in the daytime, the second pattern portions 310 and 320 of the pattern layer 300, provided in the lighting device for a vehicle 1, may be externally visible from the outside through the cover 500. Since the color layer 400 having the same color as a vehicle body V is positioned behind the pattern layer 300, the second pattern portions 310 and 320 may exhibit the same color as the vehicle body V and generate a three-dimensional pattern or a stereoscopic pattern.

Referring to FIGS. 7 and 11, when the light source 100 is turned on in the nighttime, the second pattern portions 310 and 320 of the pattern layer 300, provided in the lighting device for a vehicle 1, may be externally visible from the outside through the cover 500. Specifically, the second pattern portion 320 may overlap with the first pattern portion 220, through which light emitted from the light source 100 is transmitted. Therefore, the light from the light source 100 may also be transmitted through the second pattern portion 320.

Accordingly, when viewing the lighting device for a vehicle 1 from the outside, an area of the second pattern portion 310 through which light is not transmitted and an area of the second pattern portion 320 through which light is transmitted appear different. This allows grille lighting patterns to be generated differently in the daytime (when the light source is turned off) and in the nighttime (when the light source is turned on). In other words, lighting effect that is hidden due to the shield layer 200 when turned off becomes visible when turned on, allowing different grille images to be created in both daytime and nighttime conditions.

Referring to FIG. 1 and FIGS. 4 to 11, a lighting device for a vehicle 1 according to another embodiment of the present disclosure includes a light source 100, a shield layer 200, and a pattern layer 300.

The lighting device for a vehicle 1 according to another embodiment of the present disclosure may further include a housing 20. The housing 20 may house the light source 100, the shield layer 200, and the pattern layer 300 therein.

The housing 20 may be mounted on a vehicle body V. The housing 20 may be mounted on a grille 10 provided on a front surface portion of the vehicle body V. The grille 10 may refer to a part of the front surface portion of the vehicle body V on which a radiator grille is mounted or which is alternatively occupied by the radiator grille. The housing 20 may be mounted on a bumper 11 provided on the front surface portion of the vehicle body V, rather than on the grille 10. The housing 20 may be mounted on an interior door trim and cockpit in addition to the grille 10 and the bumper 11 to implement door trim lighting and cockpit lighting.

The housing 20 may be formed in a box shape, with an open front surface facing the front of the vehicle body V. Reference numeral 20*a* is an opening of the housing 20.

The light source 100 may be installed inside the housing 20. The light source 100 may emit light toward the front of the shield layer 200.

The light from the light source 100 passes through a cover 500 and is emitted outward, making the light externally visible from outside of the lighting device for a vehicle 1. A plurality of light sources 100 may be provided and spaced apart along the longitudinal direction of the grille 10 or the bumper 11, which is the width direction of the vehicle body V. The light source 100 may include a light emitting diode (LED).

The shield layer 200 may be positioned in front of the light source 100 and partially shield light emitted from the light source 100. The shield layer 200 may be black to increase light shielding efficiency and take the form of a film.

The shield layer 200 may have a shield portion 210 and a first pattern portion 220. The shield portion 210 shields the light emitted from the light source 100, and the first pattern portion 220 allows the light emitted from the light source 100 to be transmitted.

Since the light emitted from the light source 100 is shielded in an area of the shield portion 210 and transmitted forward only through an area of the first pattern portion 220, a lighting pattern may be generated through the shape of the first pattern portion 220. In FIG. 8, a black portion represents the area of the shield portion 210, and a white portion represents the area of the first pattern portion 220. Since light is transmitted toward the front of the shield layer 200 only through the first pattern portion 220, various grille lighting or bumper lighting effects may be created by changing the design of the first pattern portion 220.

The pattern layer 300 may be positioned in front of the shield layer 200 and include a light-transmissive material through which light is transmitted. The pattern layer 300 may have second pattern portions 310 and 320.

The second pattern portions 310 and 320 may include a three-dimensional pattern through which a three-dimensional image is created. The second pattern portions 310 and 320 may include a single or double three-dimensional pattern.

A three-dimensional optical illusion pattern may be expressed on a vehicle skin by the second pattern portions 310 and 320, through which a three-dimensional image is created when the light source 100 is turned on. Since the pattern layer 300 creates an optical illusion without a separate structure, various pattern designs may be incorporated into grille lighting or bumper lighting.

The second pattern portions 310 and 320 may be externally visible from outside of the lighting device for a vehicle 1. The three-dimensional image of the second pattern portions 310 and 320 may be externally visible from the outside in both daytime and nighttime conditions.

The pattern layer 300 may take the form of a film, thereby achieving various patterns that are difficult to express with injection-molded parts. The pattern layer 300 may be an optical pattern film. The pattern layer 300 may be made of ultraviolet (UV) resin.

The pattern layer 300 may be made of a transparent or nearly transparent material. Since the pattern layer 300 is made of a transparent or nearly transparent material, when a color layer 400 is positioned between the pattern layer 300 and the shield layer 200, the lighting device for a vehicle 1 may be seen externally in the color of the color layer 400 from the outside.

The pattern layer 300 may be attached to the cover 500 through an autoclave process.

The lighting device for a vehicle 1 according to another embodiment of the present disclosure may further include the cover 500.

The cover 500 may be positioned between the shield layer 200 and the pattern layer 300 to cover the shield layer 200. The cover 500 may be made of a transparent plastic and include a light-transmissive material. In the embodiment, the cover 500 may be made of polypropylene, which has greater strength than polycarbonate.

The cover 500 may close the front of the shield layer 200 to prevent foreign substances from entering the interior of the shield layer 200. The cover 500 may be formed in the shape of a planar or curved surface. The cover 500 may take the form of a plate or panel.

The lighting device for a vehicle 1 according to another embodiment of the present disclosure may further include the color layer 400.

The color layer 400 may be positioned between the shield layer 200 and the pattern layer 300. In the embodiment, the color layer 400 is positioned between the cover 500 and the pattern layer 300. When the cover 500 is made of polypropylene, which has lower transparency than polycarbonate, the color layer 400 may be positioned in front of the cover 500.

Since the color layer 400 includes a light-transmissive material, light from the light source 100 passes through the shield layer 200 and is emitted forward through the color layer 400.

The color layer 400 may include a film having the same color as the vehicle body.

Alternatively, the color layer 400 may include a film coated with paint having the same color as the vehicle body.

Since the color layer 400 has the same color as the vehicle body V, the lighting device for a vehicle 1 may create a continuous image without a sense of disconnection from the vehicle body V.

The lighting device for a vehicle 1 according to another embodiment of the present disclosure may have the pattern layer 300 that has a polyurethane coating on a front surface of the pattern layer 300. A coating portion 600 is coated with polyurethane. The pattern layer 300 may improve durability as the front surface of the pattern layer 300 is covered with the coating portion 600 that has good resistance to impact, wear, cutting, and tearing.

Referring to FIGS. 8 to 11, the first pattern portion 220 may be positioned to overlap with part or all of the second pattern portions 310 and 320.

For example, among the second pattern portions 310 and 320, the second pattern portion 310 may overlap with the shield portion 210 but not with the first pattern portion 220. Therefore, even if light is emitted from the light source 100, the second pattern portion 310 does not allow light to be transmitted (see FIG. 10).

Among the second pattern portions 310 and 320, the second pattern portion 320 may overlap with the first pattern portion 220. Therefore, when light is emitted from the light source 100, the second pattern portion 320 may allow light to be transmitted (see FIG. 11).

The light from the light source 100 is emitted forward only through the first pattern portion 220 of the shield layer 200. Therefore, by varying the areas where the first pattern portion 220 and the second pattern portions 310 and 320 overlap, various graphic images may be created when the light source is turned on in the nighttime.

The first pattern portion 220 of the shield layer 200 and the second pattern portion 320 of the pattern layer 300 may be manufactured such that their patterns align with or overlap each other using alignment marks in the printing process.

The operation of the lighting device for a vehicle 1 according to another embodiment of the present disclosure having the configuration described above will be described as follows.

Referring to FIGS. 6 and 10, when the light source 100 is not turned on in the daytime, the second pattern portions 310 and 320 of the pattern layer 300, provided in the lighting device for a vehicle 1, may be externally visible (i.e., visible from the outside) through the cover 500. Since the color layer 400 having the same color as a vehicle body V is positioned behind the pattern layer 300, the second pattern portions 310 and 320 may exhibit the same color as the vehicle body V and generate a three-dimensional pattern or a stereoscopic pattern.

Referring to FIGS. 7 and 11, when the light source 100 is turned on in the nighttime, the second pattern portions 310 and 320 of the pattern layer 300, provided in the lighting device for a vehicle 1, may be visible from the outside through the cover 500. Specifically, the second pattern portion 320 overlaps with the first pattern portion 220, through which light emitted from the light source 100 is transmitted. Therefore, light from the light source 100 may also be transmitted through the second pattern portion 320.

Accordingly, when viewing the lighting device for a vehicle 1 from the outside, an area of the second pattern portion 310 through which light is not transmitted and an area of the second pattern portion 320 through which light is transmitted appear different. This allows grille lighting patterns or bumper lighting patterns to be generated differently in the daytime (when the light source is turned off) and the nighttime (when the light source is turned on). In other words, lighting effect that is hidden due to the shield layer 200 when turned off becomes visible when turned on, allowing different grille images or bumper images to be created in both daytime and nighttime conditions.

Although embodiments of the present disclosure have been described with reference to the accompanying drawings, these embodiments are for illustrative purposes only, and those skilled in the art will appreciate that various modifications and other equivalent embodiments can be made from these embodiments disclosed herein. Thus, the true technical scope of the disclosure should be defined by the following claims.

What is claimed is:

1. A lighting device for a vehicle, comprising:

a light source configured to emit light;

a shield layer positioned in front of the light source and having a first geometric pattern, wherein the shield layer includes a plurality of first boundary lines defining a first geometric shape arranged repeatedly to form the first geometric pattern, and is configured to shield the light emitted from the light source except for the light emitted to the plurality of first boundary lines; and an optical pattern film positioned in front of and separate from the shield layer, including a light-transmissive material, and having second and third geometric patterns superposing each other to create a three-dimensional (3D) image when the light emitted from the light source transmitted to the optical pattern through the plurality of first boundary lines of the shield layer, wherein the optical pattern film includes:

a plurality of second boundary lines defining a second geometric shape arranged repeatedly to form the second geometric pattern, wherein the second geometric shape is different from the first geometric shape, and the plurality of second boundary lines is arranged offset from the plurality of the first boundary lines of the shield layer to avoid overlapping the plurality of the first boundary lines; and a plurality of third boundary lines defining a third geometric shape arranged repeatedly to form a third geometric pattern, wherein the third geometric shape is identical to the first geometric shape, and the plurality of third boundary lines is aligned with the plurality of first boundary lines of the shield layer to overlap the plurality of the first boundary lines.

2. The lighting device of claim 1, further comprising a color layer positioned between the shield layer and the optical pattern film and including a light-transmissive material.

3. The lighting device of claim 2, wherein:

the color layer includes a film, and the film and a vehicle body of the vehicle have a same color.

4. The lighting device of claim 2, wherein:

the color layer includes a film coated with paint, and the paint and a vehicle body of the vehicle have a same color.

5. The lighting device of claim 1, further comprising a cover positioned in front of the optical pattern film and covering the optical pattern film, the cover including a transparent material.

6. The lighting device of claim 1, wherein the second and third geometric patterns are externally visible.

7. The lighting device of claim 1, further comprising a housing configured to house the light source, the shield layer, and the optical pattern film, the housing mounted on a grille provided on a front surface portion of a vehicle body of the vehicle.

8. A lighting device for a vehicle, comprising:

a light source configured to emit light;

a shield layer positioned in front of the light source and having a first geometric pattern, wherein the shield layer includes a plurality of first boundary lines defining a first geometric shape arranged repeatedly to form the first geometric pattern, and is configured to shield the light emitted from the light source except for the light emitted to the plurality of first boundary lines;

an optical pattern film positioned in front of and separate from the shield layer, including a light-transmissive material, and having second and third geometric patterns superposing each other to create a three-dimensional (3D) image when the light emitted from the light source transmitted to the optical pattern through the plurality of first boundary lines of the shield layer; and a cover positioned between the shield layer and the optical pattern film and covering the shield layer, the cover including a transparent material, wherein the optical pattern film includes:

a plurality of second boundary lines defining a second geometric shape arranged repeatedly to form the second geometric pattern, wherein the second geometric shape is different from the first geometric shape, and the plurality of second boundary lines is arranged offset from the plurality of the first boundary lines of the shield layer to avoid overlapping the plurality of the first boundary lines; and a plurality of third boundary lines defining a third geometric shape arranged repeatedly to form a third geometric pattern, wherein the third geometric shape is identical to the first geometric shape, and the plurality of third boundary lines is aligned with the plurality of first boundary lines of the shield layer to overlap the plurality of the first boundary lines.

9. The lighting device of claim 8, further comprising a color layer positioned between the cover and the optical pattern film, the color layer including a light-transmissive material.

10. The lighting device of claim 9, wherein:

the color layer includes a film, and the film and a vehicle body of the vehicle have a same color.

11. The lighting device of claim 9, wherein:

the color layer includes a film coated with paint, and the paint and a vehicle body of the vehicle have a same color.

12. The lighting device of claim 8, wherein the second and third geometric patterns are externally visible.

13. The lighting device of claim 8, further comprising a polyurethane coating disposed on a front surface of the optical pattern film.

14. The lighting device of claim 8, further comprising a housing configured to house the light source, the shield layer, the optical pattern film, and the cover, the housing mounted on a bumper of a vehicle body of the vehicle.

15. The lighting device of claim 8, further comprising a housing configured to house the light source, the shield layer, the optical pattern film, and the cover, the housing mounted on a grille provided on a front surface portion of a vehicle body of the vehicle.

* * * * *